Oct. 20, 1936.    R. A. SPENCER    2,058,044
SEPARATOR FOR REMOVING OIL FROM WATER, SAND, AND GRAVEL

Filed March 22, 1933

INVENTOR.
RALPH A. SPENCER
BY
ATTORNEYS.

UNITED STATES PATENT OFFICE 2,058,044

SEPARATOR FOR REMOVING OIL FROM WATER, SAND, AND GRAVEL

Ralph A. Spencer, Richmond, Calif.

Application March 22, 1933, Serial No. 662,157

2 Claims. (Cl. 210—60)

The present invention relates to improvements in separators for removing oil from water, sand, and gravel, and its principal object is to provide a convenient and inexpensive means for removing oil from waste material such as collects in factories, and is usually discharged through a sewer system into an open body of water. If the oil is allowed to remain in this waste material it is very detrimental to the body of water, and particularly to any animal life in the body of water, so that it is very desirable to remove the oil from such waste material or liquid before the latter is discharged. It is apparent that the oil saved may be applied to useful purposes.

More particularly it is proposed in the present invention to pass the mixture of oil and water and whatever impurities may be carried by the water through an elongated tank, and to provide means in connection with such tank that will separate the oil from the water and will cause the oil to float off during the progress of the liquid through the tank, while the water itself passes through the tank for discharge at the other end. Solid impurities carried by the mixture of oil and water are allowed to settle in the tank and may be drawn off from time to time.

It is particularly proposed in the present invention to provide certain improvements in the means for separating the oil from the water, while the liquid passes through the tank, and to effect a fine separation between the oil and the water so that the water that leaves the discharge end of the tank is altogether clear of oil while on the other hand the oil which is floated off from the tank carries no water.

Further objects and advantages of my invention will appear as the specification proceeds.

Figure 1:
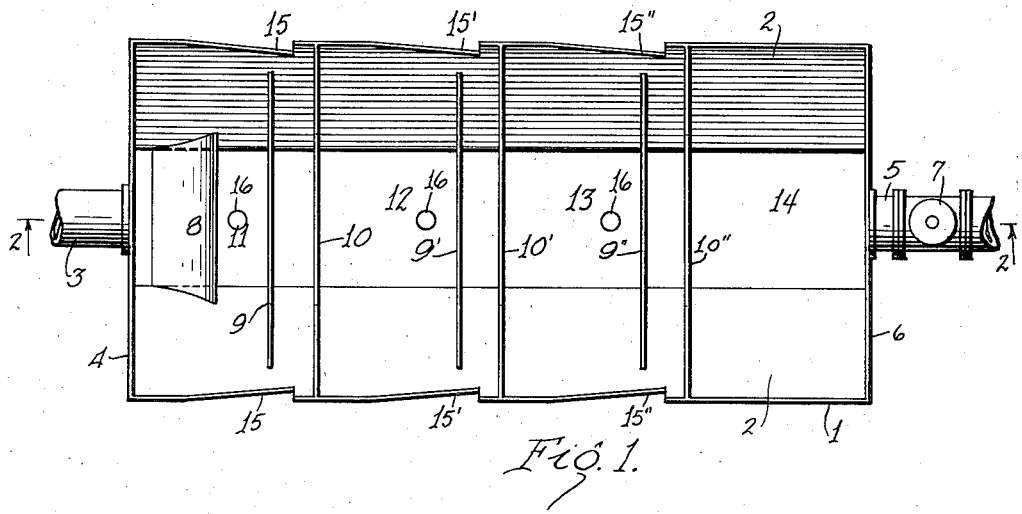
Figure 2:
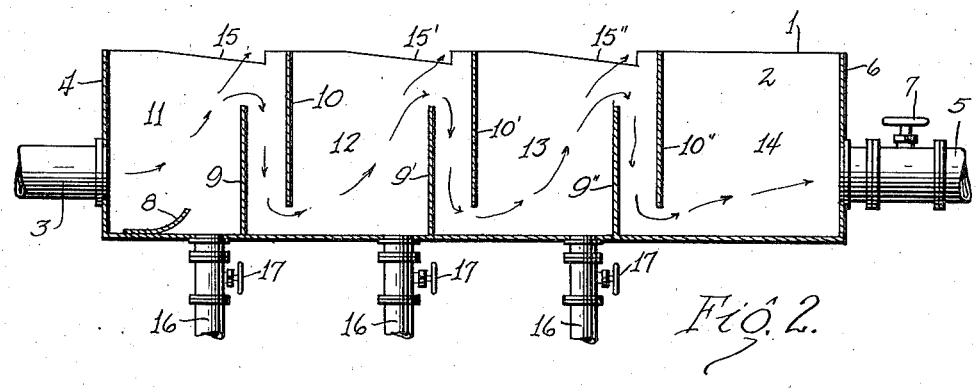

The preferred form of my invention is illustrated in the accompanying drawing, in which Figure 1 shows a plan view of my separator;

Figure 2 a vertical section taken along line 2—2 of Figure 1; and

Figure 3:
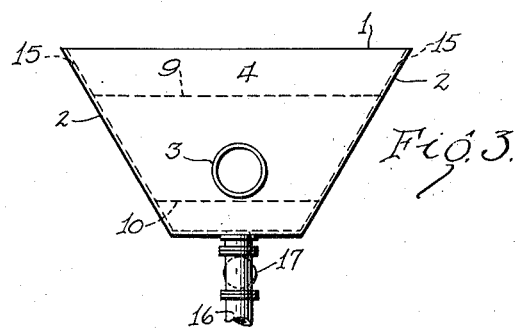

Figure 3 an end view of my separator.

While I have shown only the preferred form of my invention I wish to have it understood that various changes or modifications may be made within the scope of the claims hereto attached without departing from the spirit of the invention.

In its preferred form my invention comprises a tank 1 which is rather elongated in form, and which is provided with tapering sides 2 so that the tank widens from the bottom to the top. An inlet 3 for the mixture of oil and water and sand and other impurities is provided at one end 4 of the tank, while an outlet 5 for the water is provided at the other end 6 of the tank, and has a control valve 7 for regulating speed of the liquid passing therethrough.

As the mixture enters the tank through the pipe 3 it first strikes a deflecting plate 8, which deflects the mixture in an upward direction and has a tendency to separate the oil from the water. As the mixture advances it meets a baffle plate 9 which rises from the bottom of the tank to within a short distance of the top of the tank and rearwardly of the baffle 9 is provided a second baffle 10, which descends from the top of the tank to within close proximity of the bottom of the latter, and which forms with the baffle 9 a restricted conduit for the liquid passing through the tank. The baffle plates 9 and 10 are arranged in fairly close proximity while the baffle plate 9 is a considerable distance away from the end 4 of the tank so as to provide a compartment 11. Additional sets of baffles 9' and 10', and 9" and 10", may be provided so as to furnish further compartments 12, 13 and 14. Above the baffle plate 9 there is provided in the first compartment a notch or outlet 15 in each side over which oil may be discharged or floated off, and similar notches or outlets 15' and 15" are arranged above the baffles 9' and 9". Each of the compartments 11, 12 and 13 is provided with a pipe 16, projecting downwardly from the bottom and controlled by means of a valve 17, this pipe being used for removing from time to time sand and gravel that may accumulate on the bottom of the tank.

The operation of the device is as follows: The liquid mixture containing water, oil, sand, gravel, or other impurities is pumped, preferably under pressure, into the intake 3. Upon entering it strikes the deflecting plate 8, which has a tendency to deflect the mixture upward and to effect separation of the oil from the water to a certain extent. The liquid rises and keeps rising until it reaches the top of the baffle plate 9, when it descends through the conduit between the baffle plates 9 and 10, and continues in its forward course through the compartments 12, 13 and 14 respectively, and through the limited conduits connecting the same.

In ordinary operation, when the tank is filled, the oil which rises to the top is floated off over the notches 15, 15' and 15", while the water continues in its course and is discharged through the pipe 5. It should be particularly considered that all the liquid has to pass over the baffle 9 in a comparatively thin sheet, and in comparatively close proximity to the notch 15, which gives ample opportunity for the oil to rise to the top of the thin sheet and to be discharged over the notch 15. It should be further considered that the progress of the water while it passes over the baffle 9 is comparatively slow as compared with its speed in other sections, due to the fact that after passing over the baffle 9 the liquid has to pass downward through the limited or restricted area between the baffles 9 and 10, which is still further restricted toward the bottom, due to the fact that the sides of the tank converge toward the bottom.

Ample chance is given to the oil to be floated off in this manner, and if any oil is entrained in the water descending between the baffles 9 and 10, there will be still a strong tendency for the oil to rise and to seek its way out over the edge 15. Any oil entrained in the water that passes underneath the first baffle 10 will be subjected to a second treatment in the second set of baffles 9' and 10', and if any oil remains thereafter it will be subjected to a third treatment by the baffles 9" and 10", so that when the liquid leaves through the pipe 5, all oil has been removed.

In this connection it should be observed that the entire rate of progress may be regulated by the valve 7 so that the rate of flow may be made such as to effect a high degree of separation between oil and water. The more oil there is in the mixture the slower should be the progress of the mixture through the tank, while on the other hand the less oil the faster should be the progress. If the mixture contains no oil whatever the valve 7 should be fully opened, so that the water discharges at the same speed as it enters. If there is considerable oil in the mixture the valve-controlled opening should be restricted by the operator until the division between water discharged through the pipe 5 and oil floated off over the edges is just right.

Gravel and sand and other impurities carried by the mixture are deposited during the progress of the liquid through the tank on the bottom of the tank, and after they have accumulated to a certain extent the operation may be interrupted and the impurities may be washed out of the tank through the pipes 16.

I claim:

1. A device for separating oil from water and comprising a tank having an inlet and an outlet, a baffle extending upwardly from the tank bottom to a spaced distance from the top, a second baffle extending downwardly from the tank top to a spaced distance from the bottom, and being disposed between the first baffle and the outlet, whereby oil and water entering the tank through the inlet will flow upwardly over the first baffle and then downwardly between the baffles, the oil rising to the top of the water as the water flows over the top of the first baffle, the sides of the tank having oil overflow recesses disposed above the first baffle, the lower edges of the recesses being inclined downwardly toward the outlet end of the tank, whereby a gradually increasing area for the passage of oil is provided, and means for controlling the flow of fluid through the outlet for varying the height of the liquid as it flows over the first baffle, whereby the height of the liquid at this point can be controlled for causing the bottom of the oil layer to coincide with the recess bottom thus effecting a separation of the oil from the water.

2. An oil separator comprising a tank having inclined sides for forming a wide top and a narrow bottom, a fluid inlet disposed at one end of the tank and near the bottom, and a fluid outlet disposed at the other end, a valve for the outlet, a plurality of baffles extending upwardly from the tank bottom, a plurality of baffles extending downwardly from the top of the tank to a spaced distance from the bottom, the second set of baffles being disposed near the first for providing a plurality of gradually reducing passageways for the fluid, the sides of the tanks having recesses disposed ahead of the second set of baffles for removing the oil from the fluid said recesses having inclined lower edges that extend downwardly toward the outlet end of the tank.

RALPH A. SPENCER.